(12) United States Patent
Krueger et al.

(10) Patent No.: US 10,387,408 B2
(45) Date of Patent: Aug. 20, 2019

(54) SEARCH INTERFACE WITH SEARCH QUERY HISTORY BASED FUNCTIONALITY

(71) Applicant: SPLUNK INC., San Francisco, CA (US)

(72) Inventors: Brian Krueger, San Francisco, CA (US); Katherine Kyle Feeney, San Francisco, CA (US); Andrew E. Robbins, San Francisco, CA (US); Jesse Brandau Miller, San Francisco, CA (US); Elizabeth Dykstra-Erickson, San Francisco, CA (US); Jeffrey Thomas Lloyd, San Francisco, CA (US); Cory Eugene Burke, San Francisco, CA (US); Marc V. Robichaud, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 758 days.

(21) Appl. No.: 14/929,150

(22) Filed: Oct. 30, 2015

(65) Prior Publication Data
US 2017/0124220 A1    May 4, 2017

(51) Int. Cl.
   *G06F 16/242*    (2019.01)
(52) U.S. Cl.
   CPC .................. *G06F 16/2425* (2019.01)
(58) Field of Classification Search
   CPC .................. G06F 17/30395; G06F 16/2425

USPC .......................................................... 707/722
See application file for complete search history.

(56) References Cited

U.S. PATENT DOCUMENTS

| | | | |
|---|---|---|---|
| 6,665,668 B1 * | 12/2003 | Sugaya | G06F 17/30011 707/730 |
| 7,461,077 B1 * | 12/2008 | Greenwood | G06F 3/0482 |
| 2007/0088723 A1 * | 4/2007 | Fish | G06Q 30/00 |
| 2010/0223562 A1 * | 9/2010 | Carapella | G06Q 10/02 715/760 |

* cited by examiner

*Primary Examiner* — Joshua Bullock
(74) *Attorney, Agent, or Firm* — Shook Hardy & Bacon L.L.P.

(57) ABSTRACT

In various embodiments, methods and systems for presenting a search interface with search query history based functionality is provided. A search query history store comprising search queries is accessed. The search query history store includes search queries executed in a search computing system. A search query comprises one or more commands. A plurality of search queries retrieved from the search query history store is displayed on the search interface using a placement style. A placement style, such as an indent style, provides a structure for separating and arranging commands of a plurality of search queries displayed. The search interface further provides for receiving a selection of at least a portion of a search query from the plurality of search queries to initiate actions or execute actions based on the selection. The search interface includes a search input interface, such as a search bar, where the selection of the portion of the search query is displayed based on a selected action.

30 Claims, 24 Drawing Sheets

Original Search: 501
search "error" | stats count BY host

Sent to peers: 502
search "error" | prestats count BY host (map)

Executed by search head: 503
Merge prestats results received from peers (reduce)

SEARCH INTERFACE WITH SEARCH QUERY HISTORY BASED FUNCTIONALITY

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

SUMMARY

Embodiments described herein provide methods and systems for presenting a search interface with search query history based functionality.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 5 illustrates an exemplary search query received from a client and executed by search peers in accordance with the disclosed embodiments;

FIG. 6B illustrates a data summary dialog that enables a user to select various data sources in accordance with the disclosed embodiments;

FIGS. 9A-9H illustrate schematics of exemplary search interfaces with search query history based functionality, in accordance with embodiments described herein;

DETAILED DESCRIPTION

1.1 Overview

Figure 1:
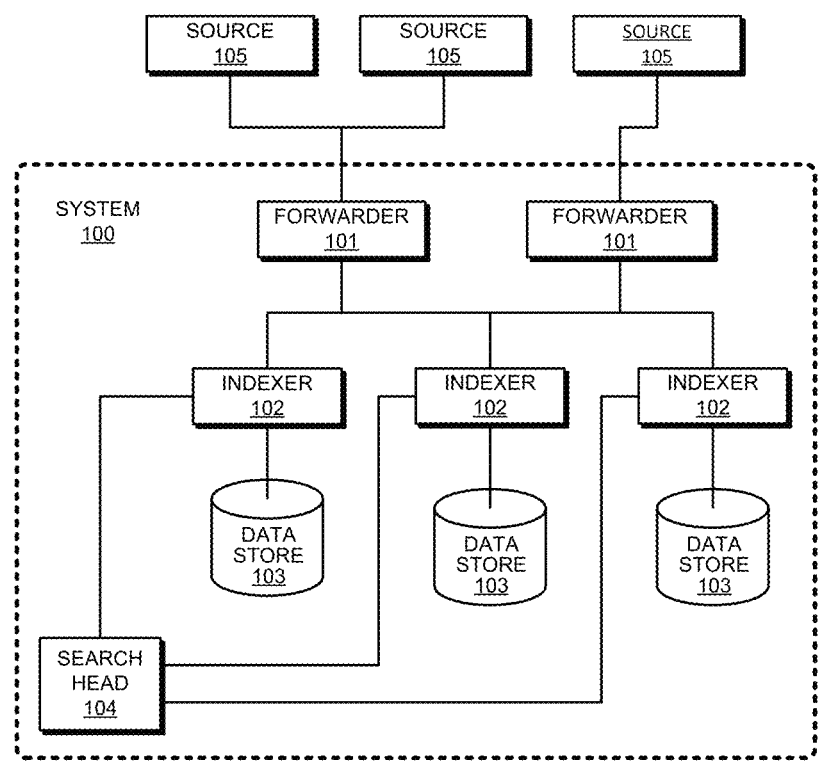
FIG. 1 presents a block diagram of an event-processing system in accordance with the disclosed embodiments.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below are further described in U.S. application Ser. No. 14/815,927 filed Jul. 31, 2015 titled "Integrating Query Interfaces," "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
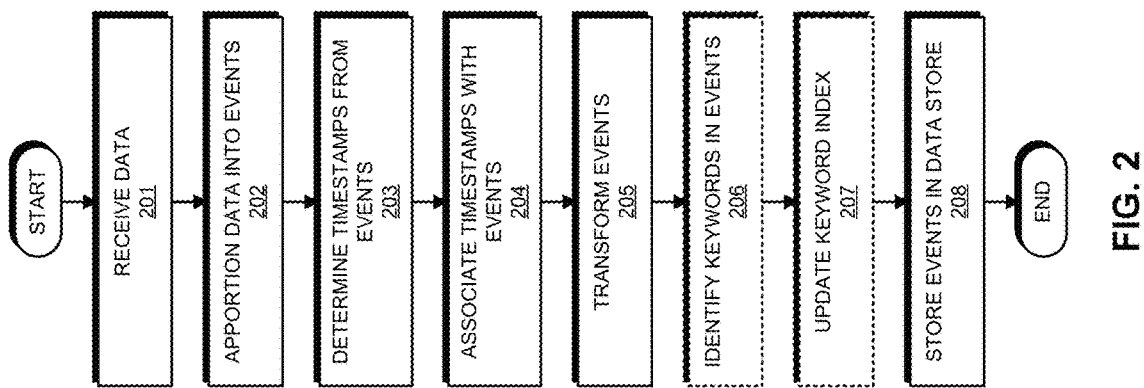
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored in flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 3:
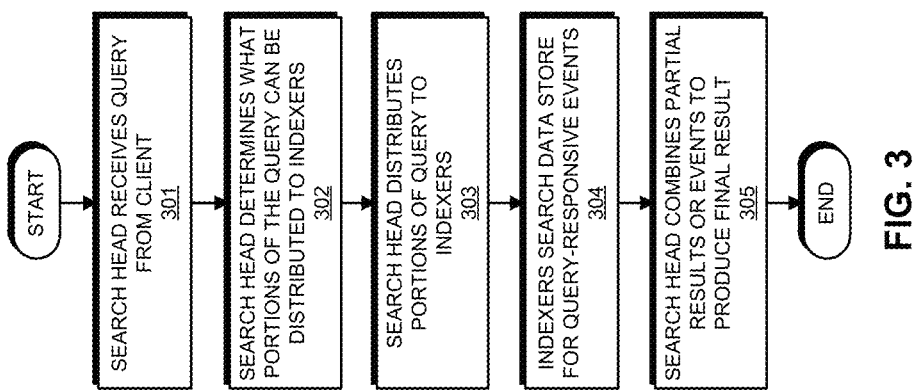
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
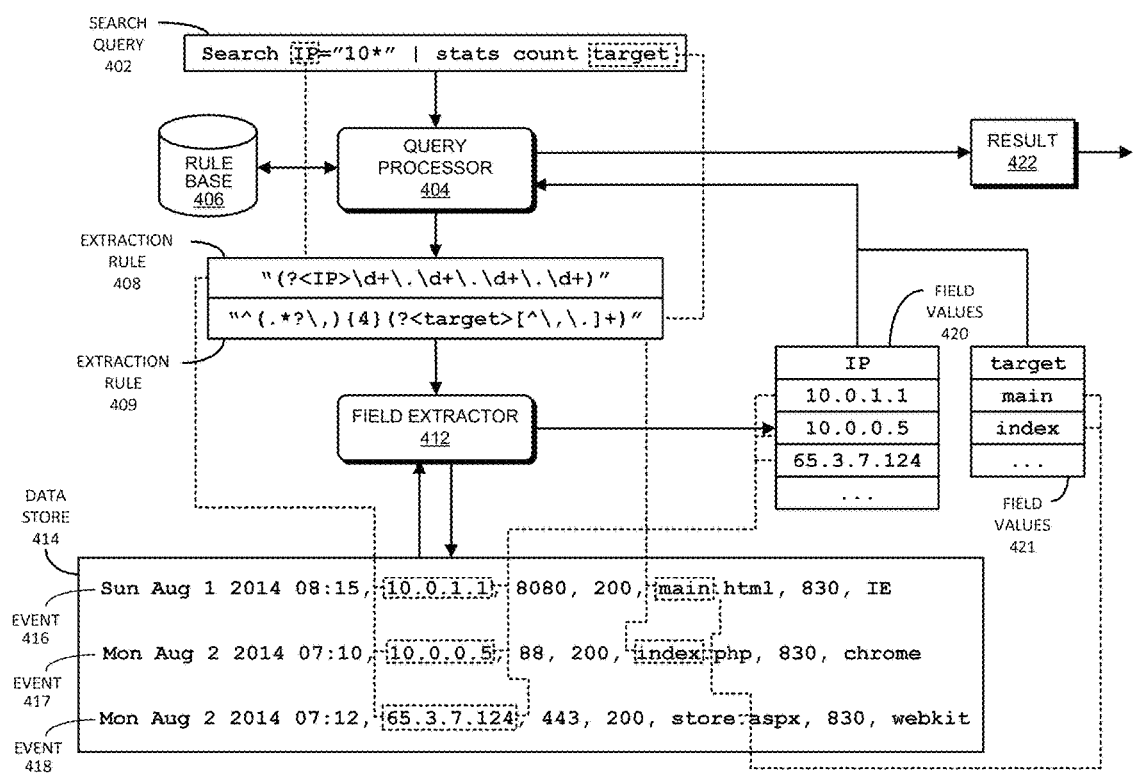
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
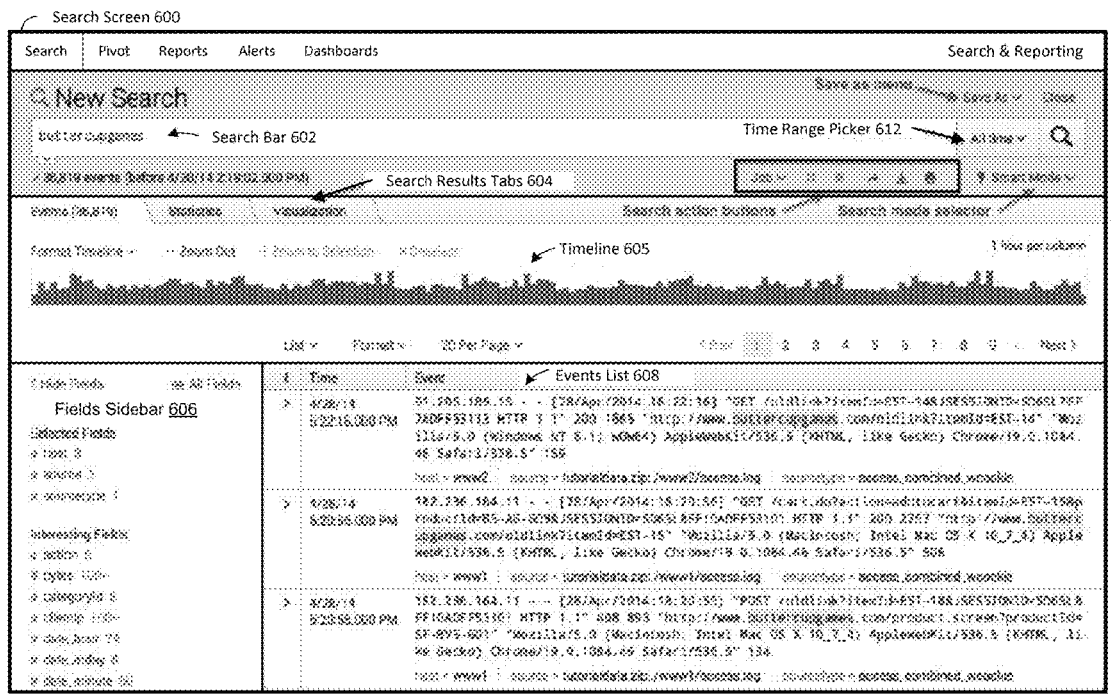
FIG. 6A illustrates a search screen in accordance with the disclosed embodiments.
Figure 6B:
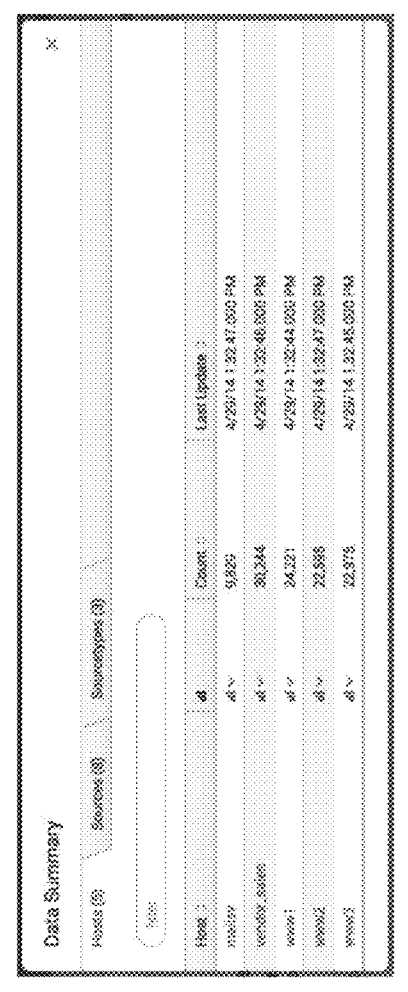

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 include: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can be split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls, and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
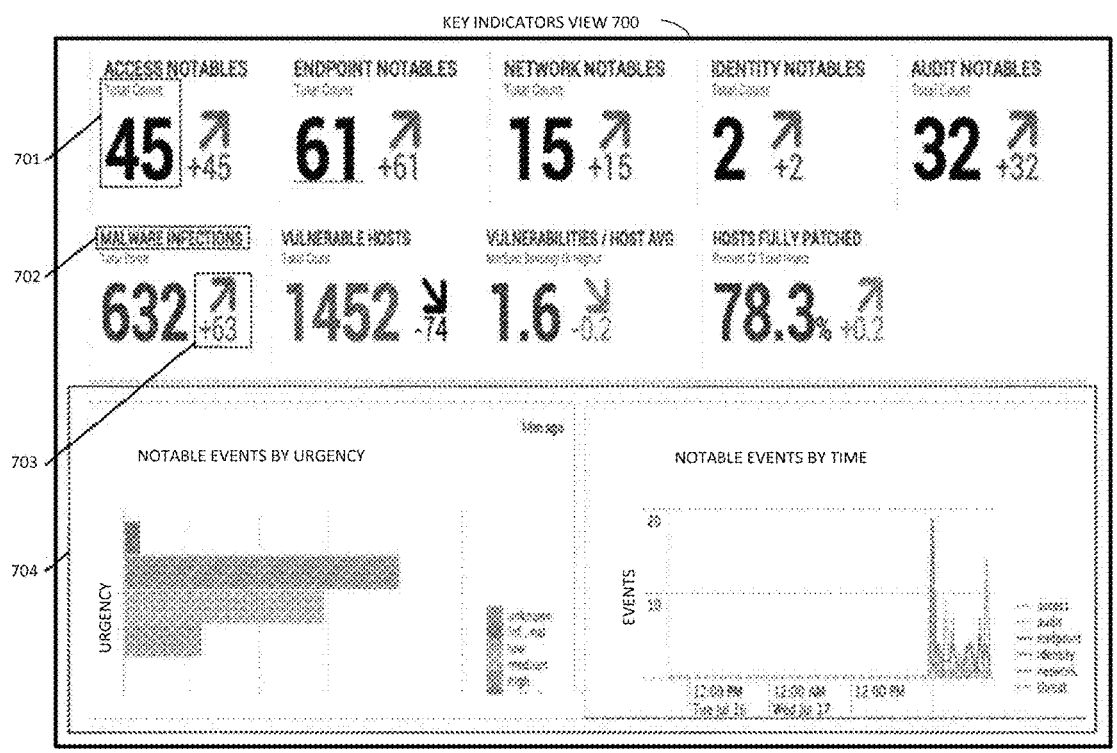
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
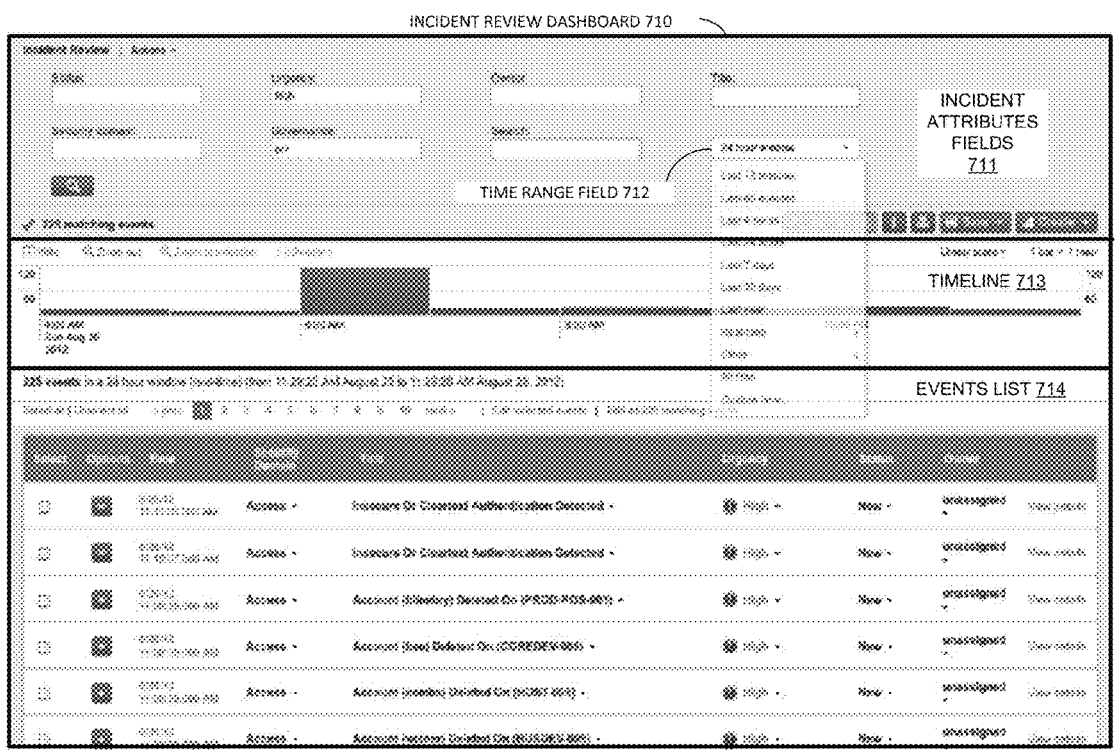
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in http://docs.splunk.com/Documentation/PCI/2.1.1/User/Incident-Reviewdashboard.

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware-.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
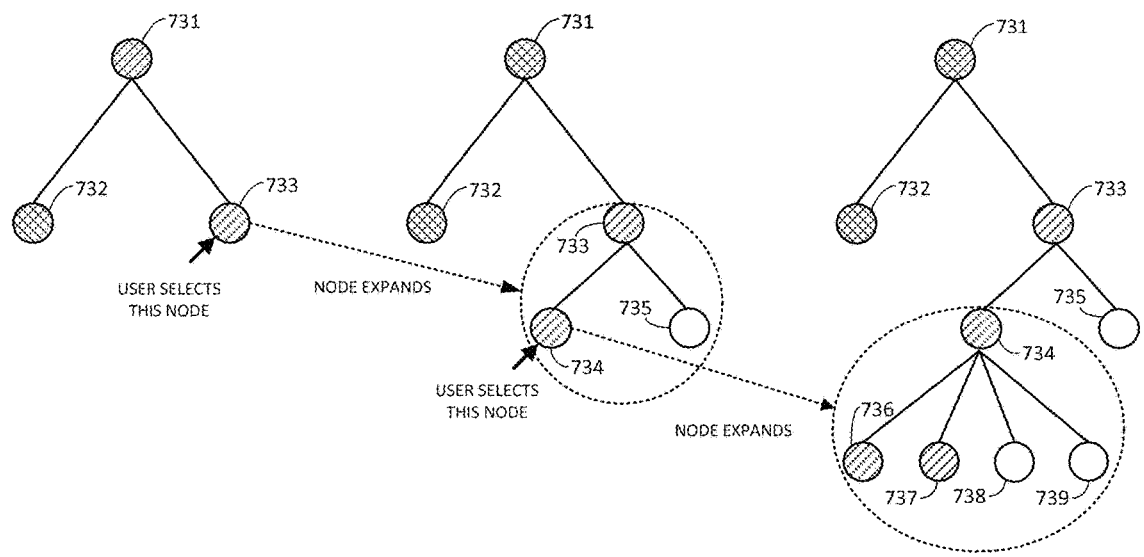
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
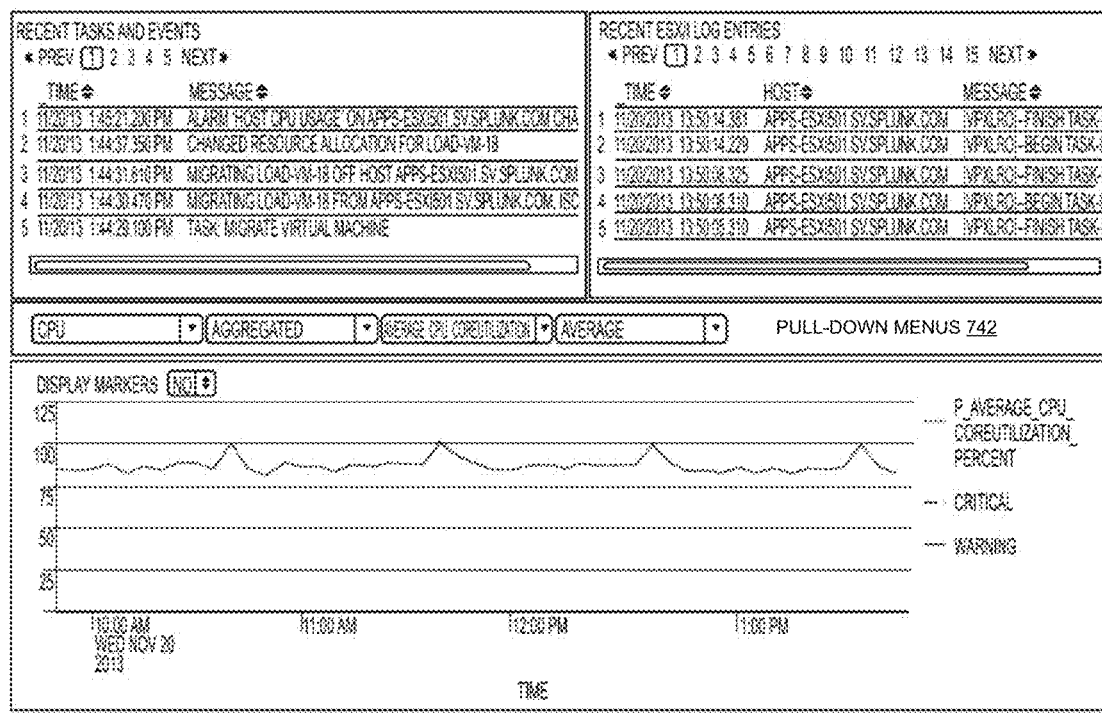
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data, and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.0 Search Interface Search Query History

Search computing systems support searching stored information to retrieve search results. For example, computing systems and other types of machines generate machine data that can be gathered, transformed, and analyzed to gain insight into the data. In particular, an event-processing search system can support searching machine data based on filtering, summarizing, and visualizing large amounts of data to answer questions about the data. Machine data can be indexed and searched for analysis, reporting and alerts. Searching is based on search queries that include commands. Search queries and commands can be based on a special-purpose language that includes syntax for defining search queries. Search computing systems can support providing search query history records. A historical record of searches performed by a user can be helpful to obviate remembering or recreating searches that have previously executed and/or stored.

Conventional search computing systems that provide search interfaces frequently only display a listing of search query history records and fail to provide search interfaces that allow for effective use of a search query history for additional functionality. In this regard, a user viewing a listing of search query history records has to sift through records to identify search query history records that are relevant to the user. Moreover, even after identifying a search query history record that is relevant, the user has to perform manual operations (e.g., copy and paste) to define new search queries that depend on the search query history records. Reviewing and defining search queries, in this manner, can be tedious and time consuming.

In addition, different types of interfaces support entering commands into systems to retrieve information. For example, a command-line interface provides a means of interaction with computer systems based on a large vocabulary of commands or queries. Command-line interfaces provide for a concise and powerful means to perform specific actions. Graphical user interfaces also allow users to interact with computing systems with graphical icons as opposed to text-based interfaces (e.g., command-line interfaces) with typed command labels or text navigation. Computing systems often rely on one or the other type of interfaces when supporting computing functionality, as such, limiting the potential of user interfaces. In this regard, providing a search interface that includes additional functionality based in part on leveraging elements of command-line interfaces and graphical user interfaces can help achieve the goals for improved operation and control of search computing systems 2.1 Search Query History Based Functionality Embodiments of the present disclosure provide simple and efficient methods and systems for presenting a search interface with search query history based functionality. A search interface presents a search query history and provides for initiating or executing specific actions and also generating additional relevant information using search queries displayed on the search interface from a search query history store. At a high level, a search query history store comprising search queries is accessed. A search query comprises one or more commands. A plurality of search queries is retrieved from the search query history store is displayed on the search interface using a placement style. A placement style, such as an indent style, provides a structure for separating and arranging commands of the plurality of search queries when displayed. The search interface further provides for selecting at least a portion of a search query from the plurality of search queries to initiate actions based on the portion of the search query. In embodiments, the interface includes a search input interface, having a search bar, where the portion of the search query is displayed in the search bar based on a selection of the portion of the search query or based on a selected action. The search input interface also supports receiving search queries as search query inputs to categorize the search queries (e.g., private search, public search, group search etc.) when stored in the search query history store. The search queries may be retrieved from the search query history store based on the corresponding category.

Further, a selection of the portion of the search query may be received, via the search interface, to cause display of the portion of the search query in the search input interface (e.g., search bar) or a clipboard pane (e.g., snippet pane) of the search interface. The portion of the search query may be added to an existing search query in the search input interface or utilized to replace at least a portion of an existing search query in the search input interface. The portion of the search query can also be stored in association with the clipboard pane, where the clipboard pane supports operations (e.g., edit, copy, transmit, delete etc.) implemented via the clipboard pane. A selection of the portion of the search query can also cause display of query assistance information, validation information, and a preview of execution metrics based at least in part on the portion of the search query.

2.2 Exemplary Search Interface System

Figure 8:
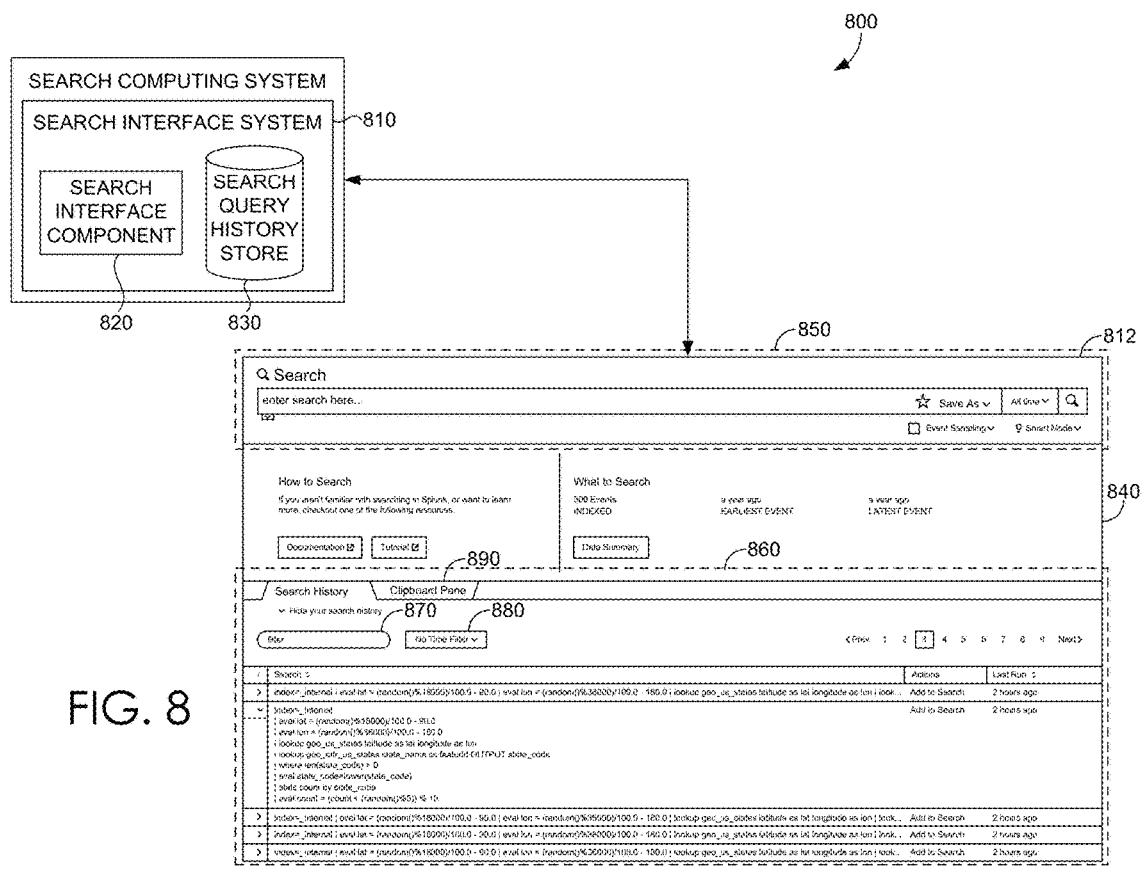
FIG. 8 illustrates block diagram of an exemplary search interface system in a search computing system, in which embodiments described herein may be employed.

Referring now to FIG. 8, the block diagram illustrates features of an exemplary search computing system 800 (e.g., event-processing system as described in FIG. 1 herein) having a search interface system 810 in which embodiments of the present disclosure may be employed. In particular, FIG. 8 shows a high level architecture of a search interface system 810 having a search interface component 820 in accordance with implementations of the present disclosure. A system, as used herein refers, to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 8, FIG. 8 illustrates a search interface system 810 running on a search computing system 800 operably coupled to a display component 812, a search interface component 820, and search query history store 830, to generate a search interface 840. The search interface system 810 can include a processor and a memory configured for providing instructions to the processor to facilitate performing operations of the search interface component 820. The search computing system 800 and the search interface system 810 can be implemented on one or more computing devices, for example, a computing device as described in FIG. 11 herein. The display component 812 can be a client computing device accessing the search computing system to perform operations supported by the search computing system 800 and the search interface system 810. At a high level, the search interface component 820 generates the search interface 840 having search query history based functionality. The search interface 840 includes a search input interface 850 and a search query history interface 860. The search interface 840 also includes a keyword filter interface 870, a time filter interface 880 and a clipboard pane 890. Additional features of the search interface 840 are discussed below with reference to exemplary search interfaces illustrated in FIGS. 9A-9H.

2.3 Search Query History Store

The search interface component 820 is responsible for accessing the search query history store 830 to retrieve search queries. The search query history store 830 refers to a collection search queries for a search computing system 800 that provides the search interface system 810. The search queries may be stored with search query attributes associated with the search query. Search query attributes refer to characteristics of a search query or information that further describes a search query. Search query attributes may be generated and stored in association with a search query. Search query attributes may include a search query command, argument, and syntax of a search query. Search query attributes may also include a search query identifier, a time a query was run, and execution metrics. In particular, execution metrics include statistics and other measured information for an executed search query. Execution metrics include search runtime (e.g., total run time of the search) search time range, search outcome status (e.g., whether the search was completed or canceled) search resource usage (e.g., servers accessed during the search) a results count, number of events accessed etc.

The search queries and corresponding search query attributes can be stored in several different types of data structures or data stores that organize the search queries so that the search queries can be efficiently retrieved. The search queries may be stored in log files that record search queries that are executed. Search queries may also be stored in a database having a collection of schemas and tables. In another exemplary embodiment, search queries may be stored as events having time stamps in the search query history store. Other variations and combinations of data structures for storing search queries and search query attributes are contemplated with embodiments described herein.

Figure 9A:
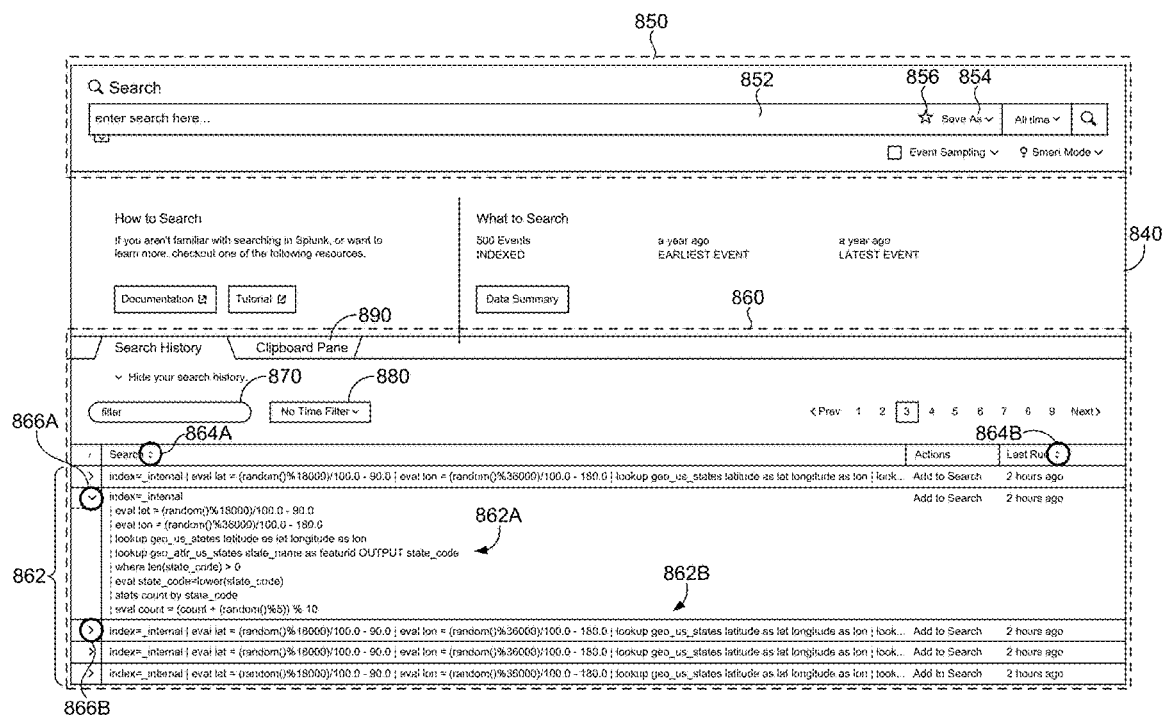

The search query history store 830 can include several different types of queries. The search queries can generally be defined as user search queries or system search queries. User search queries may specifically refer to search queries attributable to a user based on the user entering the user search query in a search input interface (e.g. a search bar). For example, as shown in FIG. 9A, the search interface 840 can include a search input interface 850 having a search bar 852 that receives search queries input by a user. System search queries are non-user search queries that are executed to support backend operations or executed on-behalf of the user to manage functionality attributable to the user. For example, a scheduled search that monitors a condition on a scheduled basis is a system search query. A search query can be identified as a specific type of search query when stored in the search query history store 830, such that, a search query history 830 can be filtered based on the particular search query types.

2.4 Search Query Attributes

With reference to a composition of a query, a query can refer to a statement or directive to a computing system to perform a specific task. A search query in particular directs a search computing system to retrieve information requested by the search query. The search queries include one or more commands that can be interpreted to retrieve information. A command may include no arguments or one or more arguments. Search commands can be used to take indexed data and filter unwanted information, extract more information, calculate values, transform them, and statistically analyze results. Search queries and search commands can be based on a search query language. A search query language can be a special purpose language designed for retrieving data from data stores. In one embodiment, the search query language is a language for managing machine-generated data. The search query language includes syntax for defining valid commands for performing searches. For example, the syntax may provide for a series of commands and arguments chained together in a search query based on a designated character (e.g., vertical bar or pipe character) preceding commands. The search interface component 820 may access and retrieve one or more search queries (e.g., a plurality of search queries) from the search query history store 830 using a history search command (e.g., |history). For example, a history search command may be defined to retrieve a history of search queries executed in a search computing system. The history command can include filters (e.g., |history-|search NOT search="|history*" AND NOT search="*metadata*" AND NOT search="*loadjob*" AND NOT savedsearch_name="*" AND NOT search="search" AND NOT search="*from sid*" AND NOT search="|eventcount summarize=false index=*index=_**"| dedup search|head 100000) that help identify a subset of search queries (e.g., user search queries), in the search query history store 830, to be displayed on the search interface. As shown above, a search query, for a search history, can include one or more filters that identify the plurality of search queries for the search query history interface. Other variations and combinations of search queries, commands and syntax elements are contemplated with embodiments of the present disclosure.

The search interface component 820 accesses the search query history store 830 to retrieve information to be displayed in the search interface 840. In particular, the search interface component 820 accesses and retrieves from the search query history store 830 search query attributes that have been configured to be displayed on the search interface 840. As such, as desired in some cases, not all search query attributes are displayed, and only a subset of search query attributes is retrieved and displayed. By way of example, with reference to FIG. 9C, FIG. 9C illustrates a subset of attributes—a status 848A, a total run time 848B, a result count 848C, and a last run time 848D displayed on the search interface 840.

The search query attributes that are part of the search interface 840 may be defined by a system administrator or a user. A system administrator of the search computing system 800 may select a default set of search query attributes for the search interface 840. The search query attributes may further, or in the alternative, be identified by a user of the search computing system 800. For example, a user preferences interface can be generated to receive a selection of search query attributes associated with search queries, to cause display of the plurality of search queries with corresponding selected search query attributes. In this regard, when accessing the search query history store 830 the search interface component 820 retrieves and/or generates information that corresponds to the search query attributes to be displayed on the search interface 840.

2.5 Search Query Parsing and Placement Style

The search interface component 820 can further parse the search query to identify and communicate commands to be displayed based on a placement style. As discussed, the search query can include one or more commands. Search queries are parsed to identify commands. Commands may be identified based comparing the commands in the search query to a repository of search commands or based on a designated character that precedes commands the search query. The search commands are then displayed based on a placement style. A placement style refers to a convention governing the position and structure of commands of a search query when the search query is displayed. A placement style may be an indent style that determines the indentation of a command of a search query when commands are displayed. As shown in FIG. 9A, the placement style indents commands based on a designated character that precedes the command. A placement style may also include a tree structure for representing successive commands of corresponding search query. In particular, a primary command may be displayed with successive commands corresponding to the primary command being indented below the primary command. In one example, a sub-search (i.e., an argument to a command that runs its own search, returning those results to the parent command as the argument value) which is associated with a different preceding character (e.g., square brackets "[") can be indented differently. In addition, syntax highlighting may be implemented in the placement style for portions of nested expression commands. The placement style having configurations for sub-searches, nested expression commands and syntax highlighting can visually indicate to a user within a search query history interface vital features of a search query. As shown, FIG. 9A includes a display of a plurality of search queries 862 and the commands 862A of a search query is displayed using a placement style. In embodiments, abstractions of discrete elements of a search query can also be building blocks for a placement style. In this regard, discrete elements of a placement style are not limited to commands and arguments but include high level abstractions of search query elements. Search query elements can be abstracted into sentences, GUI palettes or tags to present varied instantiations of search functionality. The alternate instantiations present meaning to a user where finer grained articulation can be explored within the instantiation building blocks based on a secondary gesture (e.g., double clicking). Other variations and combinations of placement styles are contemplated with embodiments of this disclosure.

2.7 Search Interface Portions

The search interface 840 is presented using the display component 812. The search interface 840 refers to a user interface that allows for effective operation and control of the search computing system 800. The search interface 840 may specifically leverage elements of a command-line interface (e.g., an interface where a user issues commands as lines of text) and a graphical user interface (e.g., an interface with graphical icons and visual indicators) to provide for initiating or executing actions on the search interface 840 based on a search query history. In this regard, the search interface 840 can include several portions (e.g., a search input interface 850, a search query history interface 860, and clipboard pane 890 as shown in FIG. 9A). The search interface 840 may provide each of these portions of the interface independently or in combination. For example, the search query history interface 860 and clipboard 890 may be implemented using user selectable tabs in the search interface 849 as shown, in FIG. 8. In an alternative embodiment, both the search query history interface 860 and clipboard 890 may be accessible in one inclusive interface (not shown). For the sake of clarity, examples described in this disclosure envision a search interface 840 having the search input interface 850 and one of the search query history interface 860 or the clipboard pane 890 displayed together based on which tab is selected.

2.8 Search Interface Collapsible Pane

The search interface 840 can present a search query from the plurality of search queries in a collapsible pane having a selectable collapse button that causes a search query to be displayed without using the placement style when the collapsible pane is collapsed. The search query is presented using the placement style when the collapsible pane is not collapsed. In FIG. 9A, the collapse button 866A is unselected to display the commands 862A of the search query using a placement style and the collapse button 866B is selected and the command 866B of the search query is not displayed using the placement style. The search interface 840 can further include quick sort button (e.g., search quick sort button 864A and last run quick sort button 864B) to cause sorting of the plurality of search queries or the last run times in ascending or descending order. The search interface can provide sorting specifically based on the search query attributes (e.g., execution metrics) displayed on the search interface.

2.9 Search Input Interface

With continued to FIG. 9A, the search input interface 850 can include a search bar 852 for receiving search queries. A user can directly enter search queries in the search bar 852 that are executed and the executed search queries stored in the search query history store 830. The search input interface 850 can also receive search queries based on a selection of a search query or a portion of a search query in the display of the plurality of search queries 862. In this regard, a search query in the search bar can be directly edited by a user before or after a search query in the search bar 852 is altered using at least a portion of a search query from the plurality of search queries.

The search input interface 850 might provide additional functionality to facilitate categorizing search queries that are stored. The search input interface 850 can include a selectable option (e.g., "save as" 854) or a tag entered in the search query itself to store search queries as part of a particular category (e.g., private search, public search, group search etc.) when the search queries are stored in the search query history store 830. For example, the user may elect to have search queries be designated as a public search query or a designated as a project search query. The search query can then be retrieved based on a corresponding category, when the plurality of search queries is retrieved from the search query history store 830.

The search input interface 850 can further support saving search queries as part of search query clips in the clipboard pane 890. A selectable save search query clip icon (e.g., "star icon" 856) may be selected to save a search query clip in the search input interface (i.e., search bar 852) to the clipboard pane 890. The search query clip can be accessed using the clipboard pane 890 to perform operations discussed herein in more detail below. Saving a search query clip can be based on the user electing to save an existing search query in the search bar. The user selects the star icon 856 that causes transmission of the search query to be stored in association with the clipboard pane 890. When storing a search query clip, additional information—search query clip attributes (e.g., a label, time saved, location saved, saving user etc. of the search query clip) may be captured and saved in association with the search query clip. The search query clip may be saved in a designated file such that it is accessible at the clipboard pane 890. In embodiments, the search query clip can be saved to be used privately by the user or shared with a designated group. In this regard, it is contemplated that the search query clip file may also be searchable, if needed, based on search query clip attributes using searching functionality described herein.

It is contemplated that when saving search queries or search query clips as part of categories or the clipboard pane 890 respectively, the user may elect to save the entire search query or only a portion of the search query in the search input interface. For example, a user can highlight a portion of the search query in a search bar and select the save as 854 or the star icon 856 to save only the highlighted portion of the search query. Other variations and combinations of designations and assigning designations to search queries as well as saving search queries as clipboard clips are contemplated with embodiments of the present disclosure.

2.10 Search Query History Interface

Figure 9B:
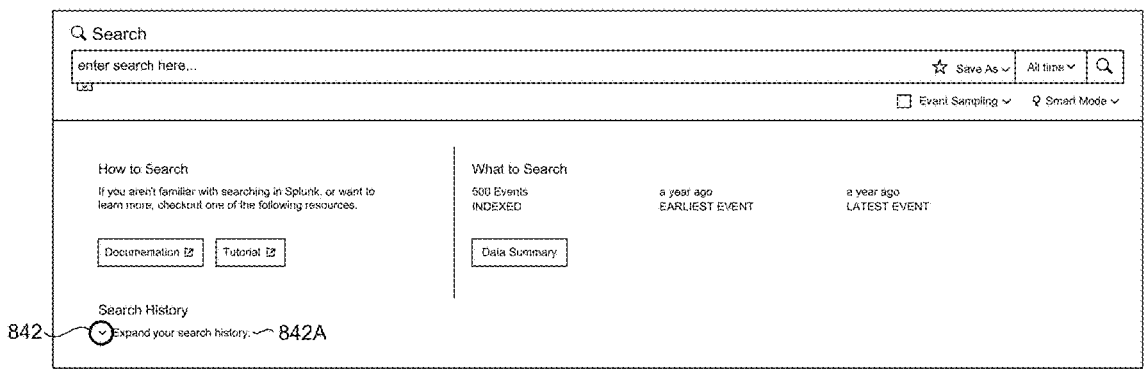
Figure 9C:
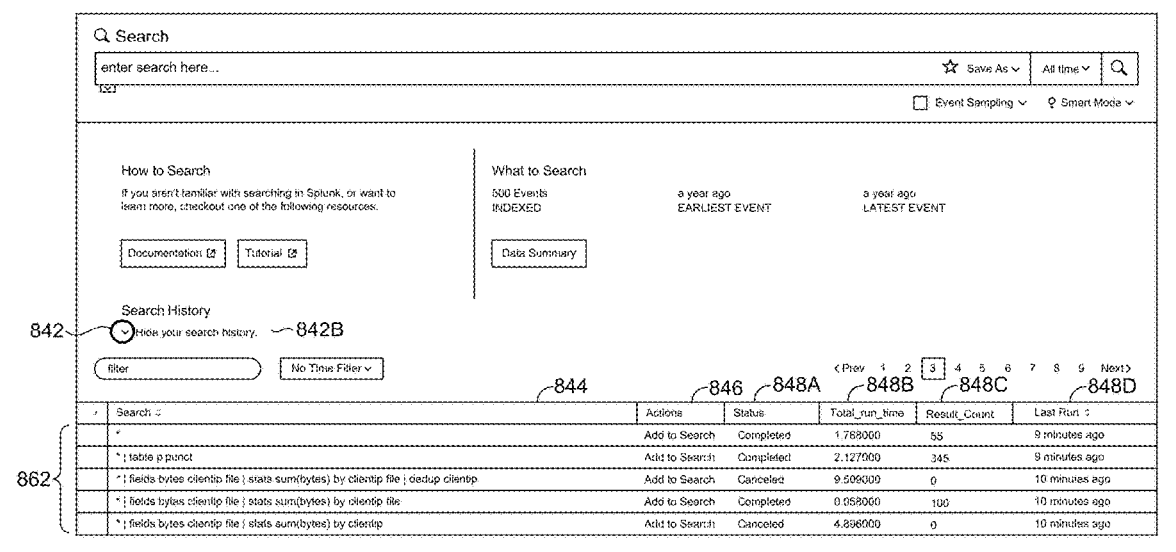

With reference to FIGS. 9B and 9C, the search query history interface 860 including the plurality of search queries is displayed based on an indication to display the search query history. The features of the search query history interface 860 can be part of a collapsible pane having a selectable collapse button that expands and collapses the collapsible pane to show and hide the features of the search query history interface 860. For example, the search interface 840 can include a collapse button 842 annotated with "Expand your search history," 842A that when unselected, expands the collapsible pane and causes display of the search query history interface 860. As shown in FIG. 9C, when displaying the search query history interface 860, the collapse button 842 can be annotated with "Hide your search history," 842B that when selected, collapses the collapsible pane and hides the search query history interface. In addition, the plurality of search queries may be displayed on the interface in a table structure 844. The table structure 844 includes rows and columns for displaying the plurality of search queries and corresponding search query attributes.

The search interface 840 also provides for additional functionality and display additional information associated with the plurality of search queries. For example, the search interface 840 can include actions 846 that are selectable to perform defined actions associated with the plurality of search queries, as discussed below in more detail. The search interface 840 can include execution metrics of the plurality of search queries. Execution metrics include statistics and other measured information for an executed search query. Execution metrics include search runtime (e.g., total run time of the search) search time range, search outcome status (e.g., whether the search was completed or canceled) search resource usage (e.g., servers accessed during the search) a results count, number of events accessed etc. By way of example, the search interface 840 may display a status 848A, a total run time 848B, a result count 848C, and a last run time 848D for each search query from the plurality of search queries. The last run time indicates an absolute time or a relative time when search query was executed. An absolute time refers to a specific date and time (e.g., Wednesday Oct. 21, 2015 2:45 PM) and a relative time refers to a time passed between a time when the search was executed and a current time (e.g., 10 minutes ago).

2.11 Keyword and Time Filter Interface

Figure 9D:
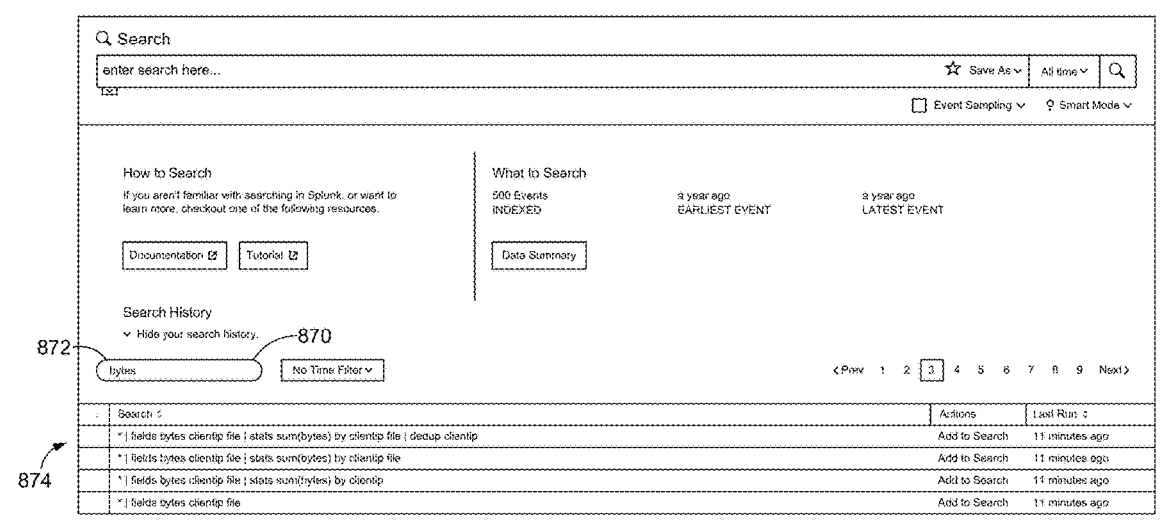
Figure 9E:
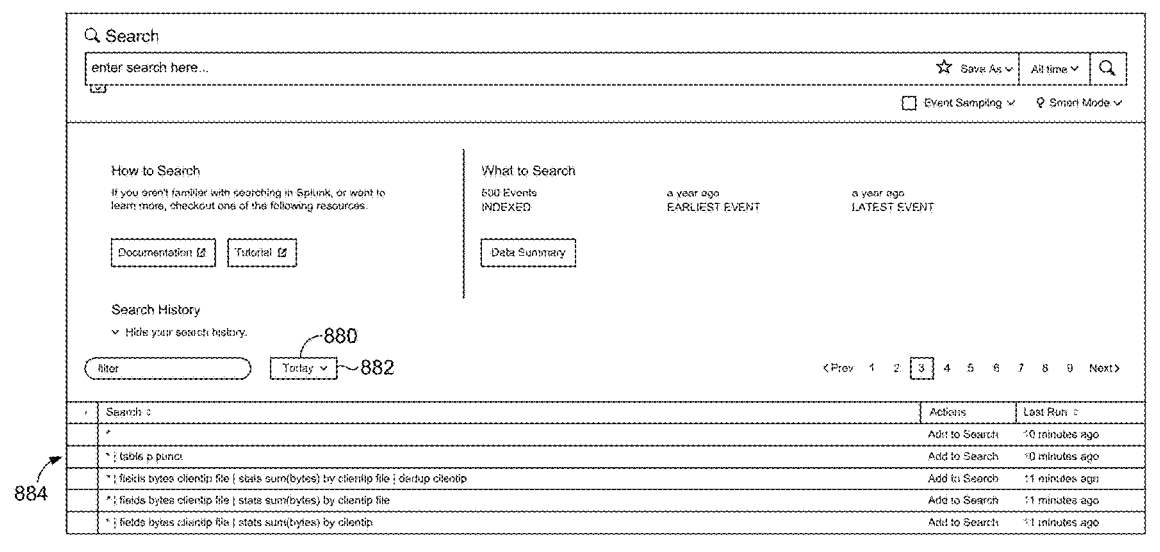

With reference to FIGS. 9D and 9E, the search interface 840 further displays provide direct manipulation graphical interface elements for interacting with the plurality of search queries. Direct manipulation graphical interface elements can include a keyword filtering interface 870 and a time filter interface 880 for identifying a subset of the plurality of search queries in the search interface. For example, the keyword filter interface 870 can receive an input of a keyword (e.g., bytes 872) to cause display of only a subset of the plurality of queries 874 that match the keyword. The subset of the plurality of search queries can be automatically populated on the search interface as the user types the keyword in the keyword filter interface 870. The time filter interface 880 can receive a selected relative time period from a set of selectable relative time periods (e.g., ran: today 882, ran in: Last 7 days, or ran in: Last 30 Days) or a selected date range from an absolute date range to cause display of only a subset of the plurality of queries 884 that were executed during the selected date range.

In embodiments, a filter indication (e.g., a selectable checkbox) (not shown) may be provided to quickly filter the plurality of search queries to only search queries attributable to a user. Further a search input interface 850 can be configured to support auto-completing search queries being entered in the search input interface based on the plurality of search queries that are displayed on the search interface 840. Sortable columns of the table structure 844 may be associated with a corresponding filter to facilitate searching the columns of the table structure. In this regard, the search interface is presented along with functionality based on the plurality of search queries to improve presentation and user interaction with the search interface. Other variations and combinations of interface portions and search interface functionality are contemplated with embodiment described herein.

2.12 Search Interface Actions

Figure 9F:
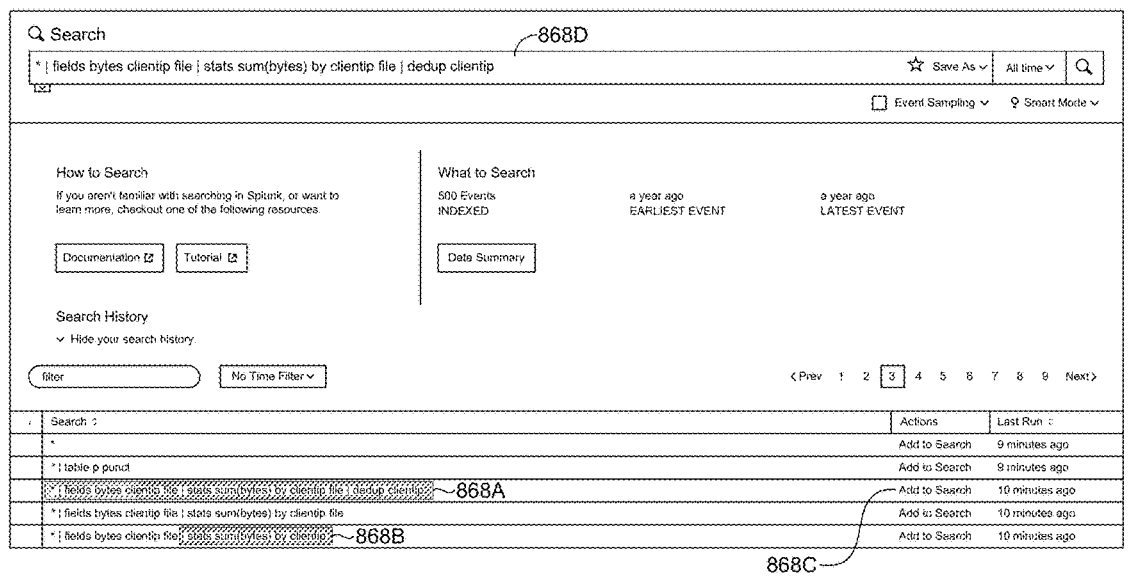

With reference to FIG. 9F, the search interface component 820 is responsible for receiving selections of search queries from a search query history listing generated on the search interface 840. The selection of the search query is received to initiate an action based on the selected search query. The selection of the search query may be a selection of an entire search query 868A or a selection of a portion of the search query 868B. The selection of the search query may also be an explicit selection of the search query or an implicit selection of the search query. An explicit selection includes a selection that is actively made by a user (e.g., using an input device). For example, a user uses a mouse cursor to highlight an entire search query (e.g, |fields bytes clientip |stats sum(bytes) clientip file | dedup clientip 868A). An implicit selection includes a selection of a search query that is made based on a selection of an action that corresponds to a search query or a portion of a search displayed on a search interface. It is contemplated that in cases where the placement style is used to display individual commands, actions may be associated with individual commands. In this regard, actions can be aligned with corresponding portions of a search query such that a selection of the action, implicitly selects the corresponding portion of the search query to perform the action. For example, a selectable link-"add to search" 868C (i.e., add a particular search query to a search bar) implicitly selects the search query |fields bytes clientip |stats sum(bytes) clientip file |dedup clientip 868A corresponding to the "add to search" link on the interface to perform the add to search action (I fields bytes clientip |stats sum(bytes) clientip file |dedup clientip 868D is added to the search bar.

The selection of the search query can initiate an action that is performed based on the selected search query. The selection of a search query may be associated with automatically initiated actions or the selection of the search query highlights the selected search query for a subsequent selected action. An automatic action might be to communicate to a search bar the selected search query from the search interface or to generate a context menu of actions that can be performed based on the selected search query. A subsequent action can be to add the selected search query to the search bar or replace an existing search query in the search bar with the selected search query.

The search interface component 820 supports several different actions that are provided through search interface 840. The actions may be presented in several ways, for example, an action can be selectable directly from the search interface as a selectable link that triggers a particular action. The particular action is displayed whenever applicable. The actions may also be provided as a context menu (e.g., a menu of action that appears when a user right clicks on a search query). Some actions may also be automatically performed upon selection of the search query. Actions, amongst others not shown, include: an action to add a selection search query to an existing query in a search input interface or an action to replace a portion or all of an existing query in a search input interface with a selection search query.

2.13 Context Sensitive Help Information

Figure 9G:
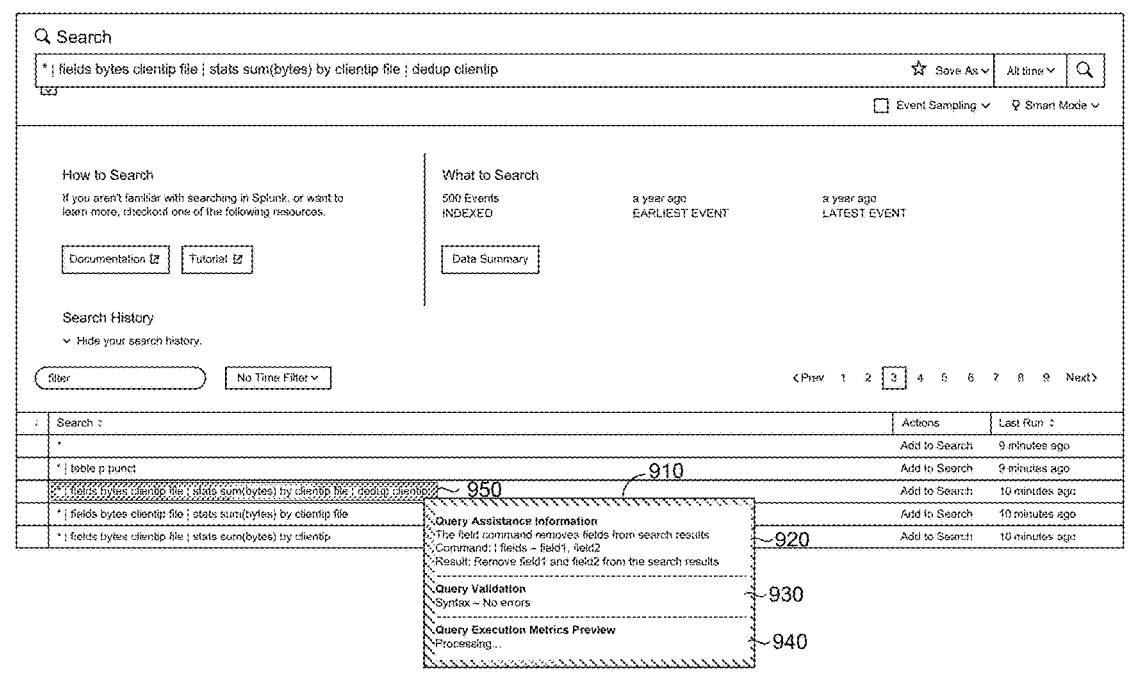

With reference to FIG. 9G, the search interface component 820 generates different types of context sensitive help information. Context sensitive help information includes various tools to facilitate formulating and executing search queries. At a high level, the search interface component 820 provides a type of integrated development environment which allows for editing search queries in a search input interface, query formulation automation tools, and validation of search queries. The context sensitive help information can be shown whenever applicable. The context sensitive help information can also be shown based on the cursor position and corresponding text (e.g., preceding or subsequent text) of the cursor. In particular, context sensitive help information is provided based in part on a search query or a portion of search query that is selected for the plurality of search queries. Context sensitive help information for the search query may be provided for the current condition of the search query or the current condition of the search query with reference to a search query that is displayed in the search input interface 850.

The context sensitive help information may always be displayed, when applicable, as part of the search interface 840. For example, the context sensitive help information may be incorporated into columns of a table structure that presents information for corresponding search queries. Context sensitive help information may, in the alternative, be displayed dynamically upon a selection of a search query (e.g., a pop-up window 910 having query assistance information 920, query validation information 930, and query execution metrics preview 940 for search query 950). The context sensitive help information can be displayed together, as shown, in pop-up window 910, however the context sensitive help information can also be displayed independently at different portions of the search interface 140. The context sensitive help information (query assistance information 920; query validation information 930; and preview of search query execution metrics 940) can be based on the entire search query or specifically on individual commands of a search query.

Query assistance information includes information for formulating search queries using a selected query from the plurality of queries. Query assistance information can include a definition of the command, the different arguments that the command utilizes, alternative versions of the command and also examples of search queries generated using the command. Validation information includes information related to error checking for search queries, in particular, syntax errors that are visually presented through the search interface. Validation information can use various techniques such as error highlighting and secondary notation to show validation information. Execution metrics include statistics and other measured information for an executed search query. Execution metrics include search runtime (e.g., total run time of the search) search time range, search outcome status (e.g., whether the search was completed or canceled) search resource usage (e.g., servers accessed during the search) a results count, number of events accessed etc. As such, a preview of search query executed metrics refers to anticipated execution metrics for a search query. Normalization and analysis techniques can be used to isolate execution metrics for commands within a search query and to further make the execution metrics independent of a dataset on which the search queries are originally executed.

The context sensitive help information can also be presented using graphical user interface elements. For example, a pop-up window or a balloon tip may be generated having information (e.g., a syntax error for a search query) for a command in the search query. The context sensitive help information may include links to relevant information while a user interacts with the different search queries. The context sensitive help information in a pop-up window or a balloon tip may be specifically based on the combination of the selected search query and a search query in the search input interface. In this regard, context sensitive help information is provided based on a command in the selected search and a command in the search input interface 840. As such, the search interface environment provides for improved user productivity in understanding and authoring search queries.

2.14 Search Interface Clipboard Pane

Figure 9H:
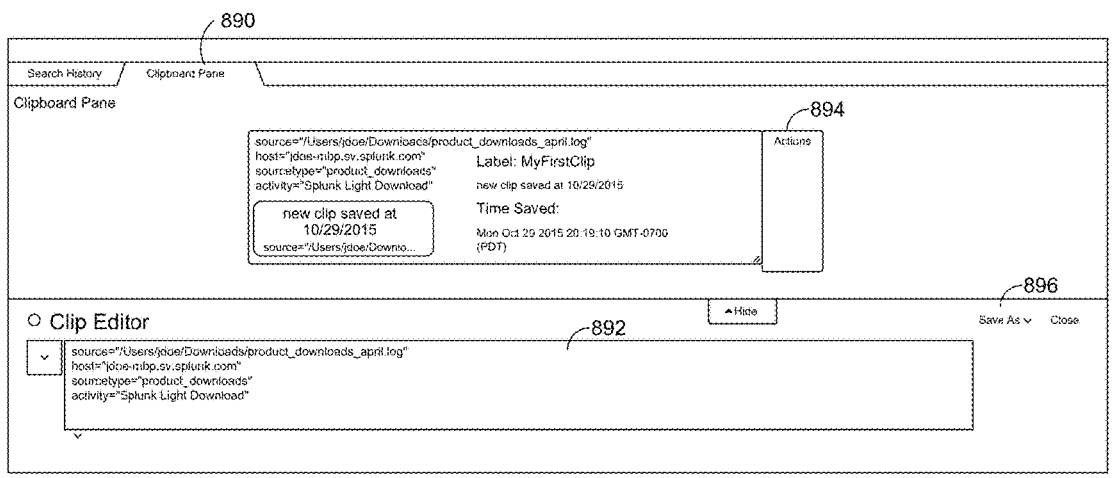

With reference to FIG. 9H, the search interface component 820 also supports presenting a clipboard pane 890. The clipboard pane 890 may refer to an integrated text editor or search query editor that is available through the search interface. The clipboard pane is a search interface enhancement that supports editing of search queries and specifically search query clips. The clipboard pane 890 supports a file for storing and retrieving search query clips. The search query clips can include search query clip attributes (e.g., e.g., a label, time saved, location saved, saving user etc. of the search query clip.). The search query clip attributes may be recorded when the search query clips are saved. The clipboard pane 890 may operate with a search query history and search input of the search interface. In particular, selected search queries from a plurality of search queries displayed as a search query history may be communicated from the search input interface, as discussed herein, and stored in a clipboard pane.

The clipboard pane 890 can support search interface features that facilitate interacting and editing search queries including copy and paste, drag and drop, auto-completion, and syntax highlighting. The clipboard pane 890 supports additional editing of the selected search query within the clip editor 892 of the clipboard pane 890. The clip editor 829 may be collapsible to hide editing functionality of the clipboard pane. The clipboard pane 890 also supports actions (e.g., actions 894) similar to the actions supported in the search query history interface (e.g., a selection of search query to automatically execute the search query or a selection such that the query is communicated the search input— add or replace—an existing search query). Similar to search queries in a search input interface the clipboard pane also support saving (e.g., save as 896) search queries with particular category designations, as discussed above. It is contemplated that the clipboard may also support context sensitive help information functionality described herein with reference to the plurality of search queries. Other variations and combination of a clipboard pane and functionality supported therein are contemplated with embodiments of the present disclosure.

3.0 Exemplary Search Interface Imeplementations

Figure 10:
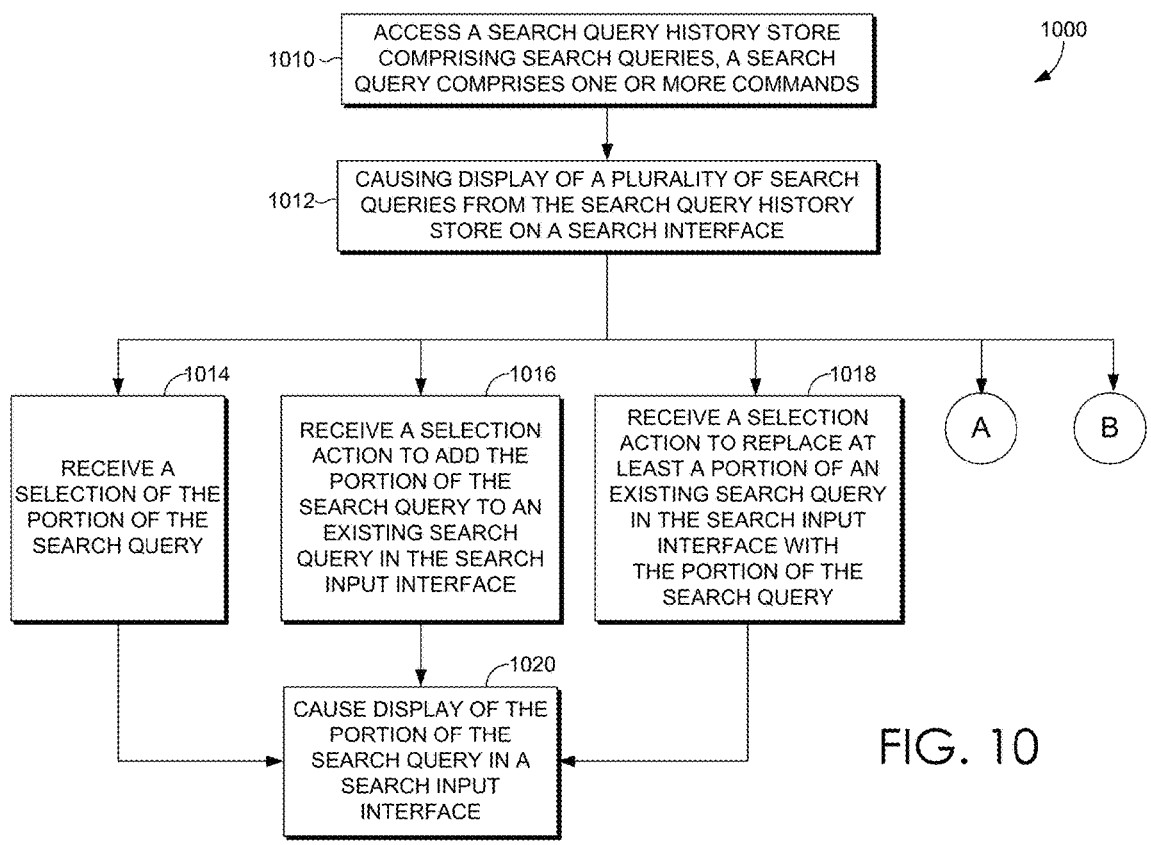
FIG. 10 presents a flow diagram showing an exemplary method for presenting a search interface having search query history based functionality, in accordance with embodiments described herein.
Figure 10:
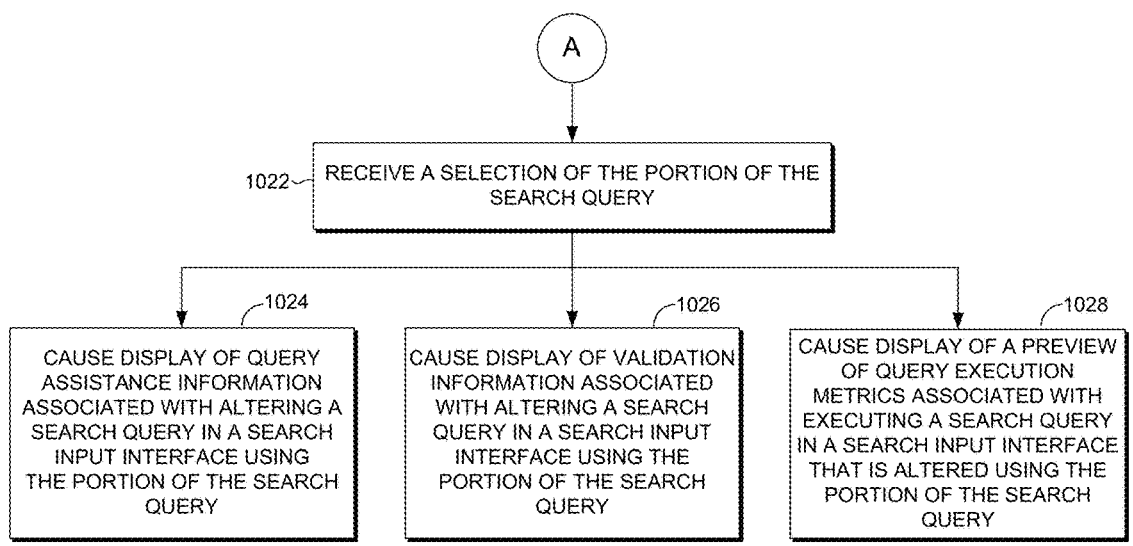
Figure 10:
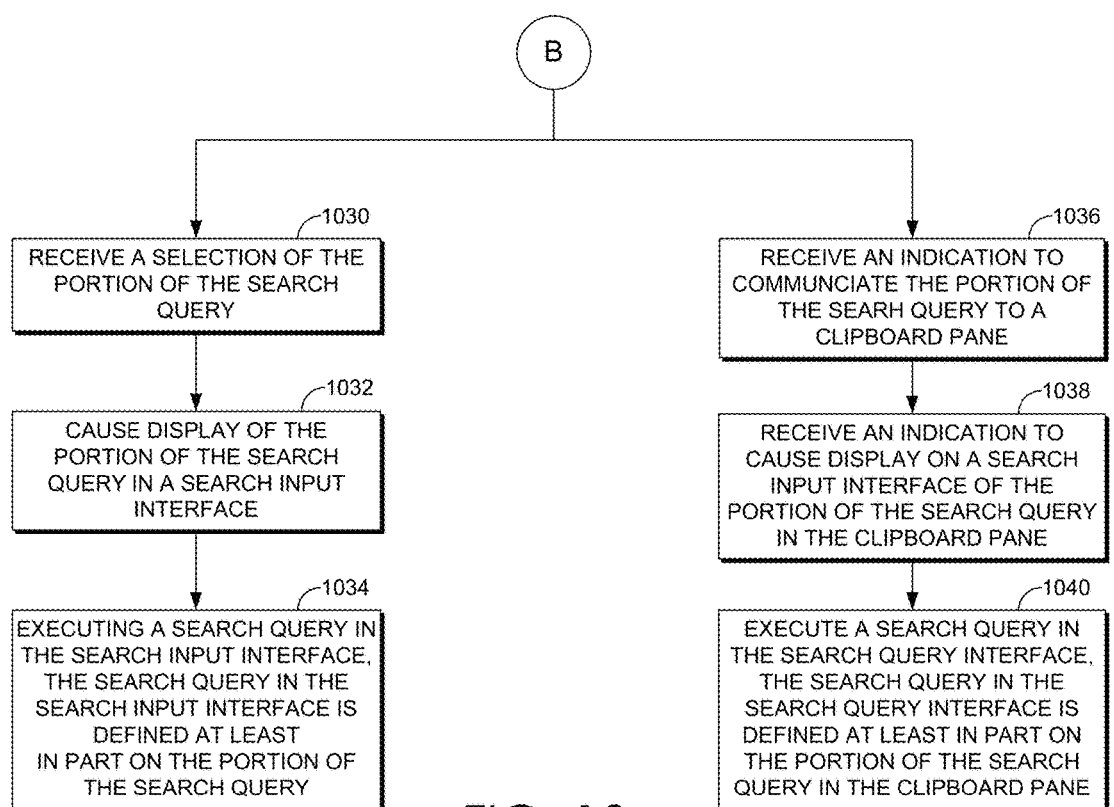

Turning now to FIG. 10, a flow diagram is provided that illustrates a method 1000 for presenting a search interface. Initially at block 1010, a search query history store is accessed. A search query comprises one or more commands. At block 1012, a display on the search interface of a plurality of search queries from the search query history store is caused. The search interface provides for receiving a selection of at least portion of a search query from the plurality of search queries to initiate an action based on the portion of the search query. The plurality of search queries is displayed using a placement style that provides a structure for displaying the plurality of search queries based on separating and arranging command of the plurality of search queries.

At block 1014, a selection of the portion of the search query is received, the selection causes display of the portion of the search query on the search input interface at block 1020.

At block 1016, a selection of an action to add the portion of the search query to an existing search query in a search input interface is received, the action causes display of the portion of the search query on the search input interface at block 1020.

At block 1018, a selection of an action to replace at least a portion of an existing search query in the search input interface with the portion of the search query, that action causes display of the portion of the search query on the search input interface at block 1020

At block 1022, a selection of the portion is the search query is received. At block 1024, a display of query assistance information associated with altering a search query in a search query input interface using the portion of the search query is caused. At block 1026, a display of validation information associated with altering a search query in a search query input interface using the portion of the search query is caused. At block 1028, a display of a preview of query execution metrics associated with executing a search query in a search input interface that is altered using the portion of the search query is caused.

At block 1030, a selection of the portion is the search query is received. At block 1032, a display in a search input interface of the portion of the search query is caused. At block 1034, a search query in the search input interface is executed. The search query in the search input interface is defined at least in part on the portion of the search query.

At block 1036, an indication to communicate the portion of the search query to a clipboard pane is received. At block 1038, an indication to cause display on a search input interface of the portion of the search query in the clipboard pane, is received. At block 1040, a search query in the search query interface is executed. The search query in the search query interface is defined at least in part on the portion of the search query in the clipboard pane.

4.0 Exemplary Operating Environment

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 11:
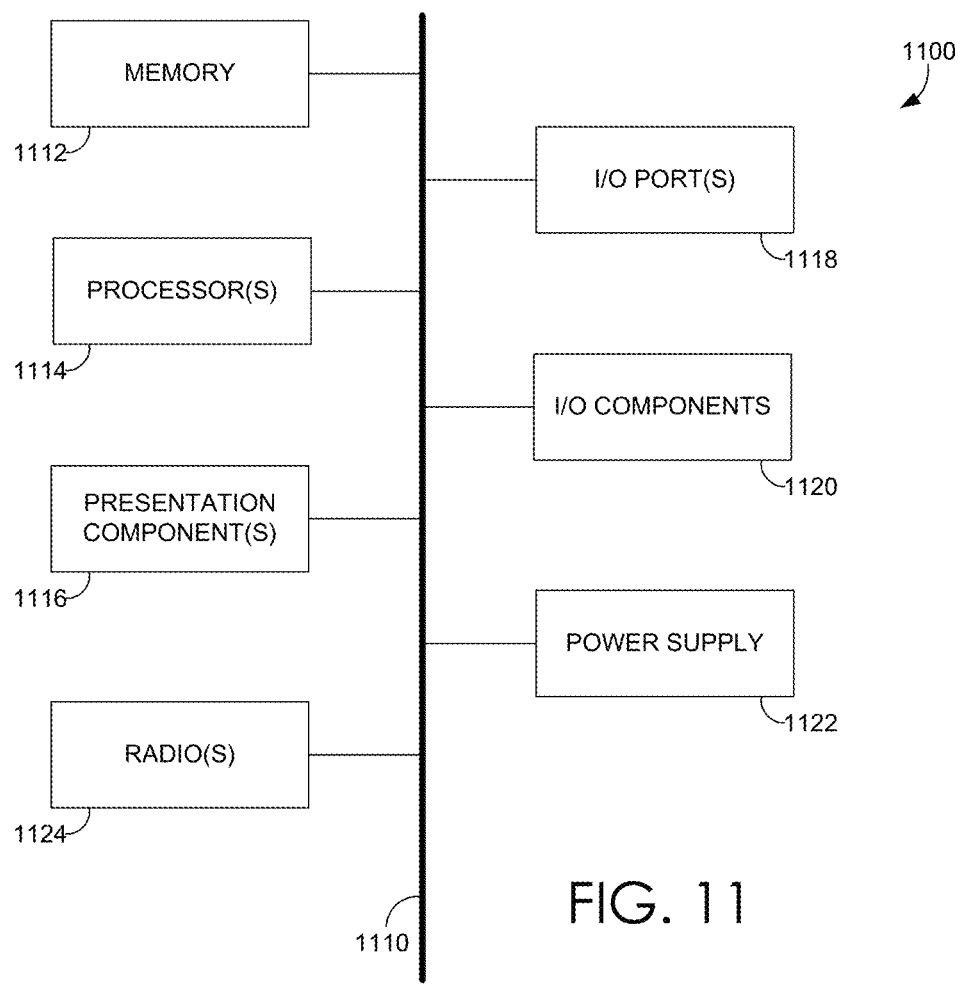
FIG. 11 is a block diagram of an exemplary computing environment suitable for use in implementing embodiments described herein.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

5.0 Exemplary Embodiments

In a first embodiment described herein, a computer-implemented method for generating a search interface with search query history based functionality is provided. The method includes accessing a search query history store comprising search queries. A search query comprises one or more commands. The method also includes causing display of a plurality of search queries from the search query history store on a search interface, the search interface provides for receiving a selection of at least a portion of a search query from the plurality of search queries to initiate an action based on the portion of the search query. The plurality of search queries are displayed using a placement style that provides a structure for displaying the plurality of search queries based on separating and arranging commands of the plurality of search queries.

Accordingly, in a second embodiment described herein, one or more computer storage media having computer-executable instructions embodied thereon that, when executed, by one or more processors, causes the one or more processors to perform a method for generating a search interface with search query history based functionality is provided. The method includes accessing a search query history store comprising search queries. A search query comprises one or more commands. The method also includes causing display of a plurality of search queries from the search query history store on a search interface, the search interface provides for receiving a selection of at least a portion of a search query from the plurality of search queries to initiate an action based on the portion of the search query. The plurality of search queries is displayed using a placement style that provides a structure for displaying the plurality of search queries based on separating and arranging commands of the plurality of search queries.

In a third embodiment described herein, a system for generating a search interface with search query history based functionality is provided. The system comprises a processor and a memory configured for providing computer program instructions to the processor. The system further comprises a search interface component configured to access a search query history store comprising search queries. A search query comprises one or more commands. The search interface component is further configured to cause display of a plurality of search queries from the search query history store on a search interface, the search interface provides for receiving a selection of at least a portion of a search query from the plurality of search queries to initiate an action based on the portion of the search query. The plurality of search queries is displayed using a placement style that provides a structure for displaying the plurality of search queries based on separating and arranging commands of the plurality of search queries.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments are described with reference to computing devices and components of a search computing system having a search interface system. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method comprising:
   accessing a search query history store comprising search queries, each search query comprising one or more commands of a query language;
   parsing a search string of a search query to identify a plurality of commands of the search query specified in the search string and to identify that at least one discrete element of a placement style is represented in the search string; and
   causing display of a plurality of search queries from the search query history store on a search interface,
   the search interface providing for receiving a selection of at least a portion of the search query from the plurality of search queries to initiate an action based on the selection, and
   wherein the search query is displayed using the placement style that defines a structure for separating and arranging the identified plurality of commands of the search query in a display in a manner defined by the placement style for the at least one discrete element based on the parsing of the search string and the at least one discrete element being represented in the search string.

2. The method of claim 1, wherein a search query is stored in association with one or more search query attributes, at least a subset of the one or more search query attributes is retrievable for display on the search interface.

3. The method of claim 1, wherein the search query history store comprises user search queries and system search queries, wherein user search queries are attributable to a user based on the user entering the user search queries in a search input interface.

4. The method of claim 1, wherein accessing the search query history store further comprises selecting the plurality of search queries from the search query history store based on executing a history search query comprising one or more commands that indicate filters for identifying the plurality of search queries.

5. The method of claim 1, wherein accessing the search query history store further comprises retrieving information associated with the plurality of search queries based on search query attributes to be displayed on the search interface.

6. The method of claim 1, wherein upon accessing the search query history, the method further comprises:
   parsing the plurality of search queries to identify corresponding commands of each of the plurality of search queries; and
   communicating the plurality of search queries and the corresponding commands for display based on the placement style.

7. The method of claim 1, wherein the placement style is an indent style causing display of commands of the plurality of search queries on the search interface based on the indent style that indents commands of based at least in part on a designated character that precedes the commands.

8. The method of claim 1, wherein the search interface presents the plurality of search queries in collapsible panes that cause a search query in a collapsible pane to be displayed using the placement style when the collapsible pane is not collapsed and the search query is displayed without using the placement style when pane is collapsed.

9. The method of claim 1, wherein causing display of a plurality of search queries, from the search query history store, on the search interface, is based on an indication to display the plurality of search queries on the interface.

10. The method of claim 1, wherein the wherein the discrete element comprises one or more of at least one character that is separate from a command or command argument or a location of at least one character.

11. The method of claim 1, further comprising the search input interface to receive a search query having a category designation for storing the search query, the category designation causes the search query to be retrieved based on the category designation.

12. The method of claim 1, further comprising a search input interface that is a search bar having a search query in the search bar, the search query is editable by a user before or after the search query is altered using a selection of the portion of the search query.

13. The method of claim 1, wherein the search interface comprises a table structure having rows and columns for displaying the plurality of search queries and search query attributes corresponding to the plurality of search queries.

14. The method of claim 1, wherein the search interface further comprises search query attributes that are search execution metrics corresponding to executing commands of the plurality of queries.

15. The method of claim 1, wherein the search interface further comprises a last run time for each search query from the plurality of search queries, wherein the last run time indicates at least one of: an absolute time or a relative time a selected search query is executed.

16. The method of claim 1, wherein the search interface further comprises a keyword filtering interface that filters the plurality of search queries based on a selected keyword.

17. The method of claim 1, wherein the interface further comprises a time filtering interface that filters the plurality of search queries based on a selected time range.

18. The method of claim 1, wherein the search interface further comprises a filter indication to isolate search queries attributable to a user from the plurality of search queries in the search interface.

19. The method of claim 1, further comprising a search input interface that auto-completes search queries using the plurality of search queries.

20. The method of claim 1, wherein selecting the portion of the search query is an implicit selection based on a selection of a corresponding action provided on the search interface.

21. The method of claim 1, wherein the search interface further comprises a selectable action that causes display of the portion of the search query in a search input interface, wherein the selectable action is an action to add, to an existing search query in the search input interface, the portion of the search query.

22. The method of claim 1, wherein the search interface further comprises a selectable action that causes display of the portion of the search query, in a search input interface, wherein the selectable action is an action to replace at least a portion of an existing search query in the search input interface with the portion of the search query.

23. The method of claim 1, further comprising:
receiving a selection of the portion of the search query; and
causing display of the portion of the search query in a search input interface;
executing a search query in the search input interface, the search query in the search input interface is defined at least in part on the portion of the search query.

24. The method of claim 1, further comprising:
receiving a selection of the portion of the search query; and
causing display of query assistance information associated with altering a search query in a search input interface using the portion of the search query.

25. The method of claim 1, further comprising:
receiving a selection of the portion of the search query; and
causing display of validation information associated with altering a search query in a search input interface using the portion of the search query.

26. The method of claim 1, further comprising:
receiving a selection of the portion of the search query; and
causing display of a preview of query execution metrics associated with executing a search query in a search input interface that is altered using the portion of the search query.

27. The method of claim 1, the method further comprising: receiving an indication to communicate the portion of the search query to a clipboard pane.

28. The method of claim 1, further comprising:
receiving an indication to cause display of at least a portion of a search query in a clipboard pane on a search input interface; and
executing a search query in the search query interface, the search query in the search query interface is defined at least in part on the portion of the search query in the clipboard pane.

29. A system comprising:
one or more processors; and
memory having instructions stored thereon, the instructions when executed by the one or more processors, cause to the system to perform a method comprising:
accessing a search query history store comprising search queries, each search query comprising one or more commands of a query language;
parsing a search string of a search query to identify a plurality of commands of the search query specified in the search string and to identify that at least one discrete element of a placement style is represented in the search string; and
causing display of a plurality of search queries from the search query history store on a search interface,
the search interface providing for receiving a selection of at least a portion of the search query from the plurality of search queries to initiate an action based on the selection, and
wherein the search query is displayed using the placement style that defines a structure for separating and arranging the identified plurality of commands of the search query in a display in a manner defined by the placement style for the at least one discrete element based on the parsing of the search string and the at least one discrete element being represented in the search string.

30. One or more non-transitory computer storage media having computer-executable instructions embodied thereon that, when executed, by one or more processors, causes the one or more processors to perform a method, the method comprising:
accessing a search query history store comprising search queries, each search query comprising one or more commands of a query language;
parsing a search string of a search query to identify a plurality of commands of the search query specified in the search string and to identify that at least one discrete element of a placement style is represented in the search string; and
causing display of a plurality of search queries from the search query history store on a search interface,
the search interface providing for receiving a selection of at least a portion of the search query from the plurality of search queries to initiate an action based on the selection, and
wherein the search query is displayed using the placement style that defines a structure for separating and arranging the identified plurality of commands of the search query in a display in a manner defined by the placement style for the at least one discrete element based on the parsing of the search string and the at least one discrete element being represented in the search string.

* * * * *